United States Patent [19]

Berger et al.

[11] Patent Number: 4,739,679
[45] Date of Patent: Apr. 26, 1988

[54] BIFILAR PENDULUM VIBRATION DAMPER FOR AUTOMOTIVE INSTALLATION

[75] Inventors: Alvin H. Berger, Wyandotte; Roy E. Diehl, Northville; Anthony Verduce, Southgate, all of Mich.

[73] Assignee: Ford Motor Company, Dearborn, Mich.

[21] Appl. No.: 70,652

[22] Filed: Jul. 10, 1987

Related U.S. Application Data

[63] Continuation of Ser. No. 821,719, Jan. 23, 1986, abandoned.

[51] Int. Cl.$^4$ .............................................. F16F 15/10
[52] U.S. Cl. .......................................... 74/574; 74/604
[58] Field of Search ................ 74/574, 572, 573, 604; 416/144, 145, 500; 73/468, 469

[56] References Cited

U.S. PATENT DOCUMENTS

| | | |
|---|---|---|
| 1,799,392 | 4/1931 | Rhys ........................................ 74/572 |
| 1,949,478 | 3/1934 | Kindelmann et al. ............ 74/574 X |
| 2,029,796 | 2/1936 | Salomon .................................. 74/574 |
| 2,079,226 | 5/1937 | Sarazin ................................... 74/574 |
| 2,184,734 | 12/1939 | Chilton . |
| 2,272,189 | 2/1942 | De Pew .......................... 74/574 X |
| 2,306,959 | 12/1942 | Knibbe ................................... 74/574 |
| 2,313,024 | 3/1943 | Salomon .................................. 74/604 |
| 2,332,072 | 10/1943 | Gregory et al. ....................... 74/604 |
| 2,344,430 | 3/1944 | Vaughan et al. ...................... 74/604 |
| 2,359,180 | 9/1944 | Williams ................................. 74/574 |
| 2,367,709 | 1/1945 | Duntov et al. ........................ 74/574 |
| 2,378,592 | 6/1945 | Specht ................................... 74/604 |
| 2,379,255 | 6/1945 | Rubissow ............................... 74/574 |
| 2,535,958 | 12/1950 | Sarazin ................................... 74/574 |
| 2,590,579 | 3/1952 | Sarazin ................................... 74/574 |
| 2,665,546 | 1/1954 | Haaften ............................ 74/573 X |
| 3,540,809 | 11/1970 | Paul et al. . |
| 3,874,818 | 4/1975 | Saunders et al. ..................... 416/144 |
| 3,932,060 | 1/1976 | Vincent et al. ....................... 416/145 |
| 4,218,187 | 8/1980 | Madden ................................. 416/145 |

FOREIGN PATENT DOCUMENTS

| | | |
|---|---|---|
| 1000629 | 2/1952 | France ................................... 74/604 |
| 401962 | 11/1933 | United Kingdom . |
| 444222 | 3/1936 | United Kingdom ................... 74/604 |

OTHER PUBLICATIONS

Practical Solutions of Torsional Vibration Problems, W. Ker Wilson vol. 4, Devices for Controlling Vibrations, 3rd Ed. Chapman & Hall Ltd. London.
A.P.C. Application of K. Rothe et al., Ser. No. 373,534, Published Jun. 1, 1943.

Primary Examiner—Gary L. Smith
Assistant Examiner—Rodney M. Lindsey
Attorney, Agent, or Firm—Robert E. McCollum; Clifford L. Sadler

[57] ABSTRACT

A bifilar type pendulum automotive engine vibrational damper has at least one pendulum with an inner curved cam follower surface that is alternately engaged and disengaged from a pin type cam fixed on the pendulum carrier during low engine crankshaft operating speeds, such as during engine start up or shut-down, to force the pendulum to follow a path close to the path defined by the swinging arcuate movement of the pendulum during operation at normal engine crankshaft operating speeds, a minimal radial clearance being provided between the pendulum's curved surface and pin during the normal crankshaft operating speeds to reduce the impact of metal to metal contact between the pendulum and rollers or pendulum and carrier and resultant noise when the pendulum alternately falls inwardly against the carrier in response to gravity and then is forced outwardly due to centrifugal force.

1 Claim, 2 Drawing Sheets

BIFILAR PENDULUM VIBRATION DAMPER FOR AUTOMOTIVE INSTALLATION

This application is a continuation of application Ser. No. 821,719, filed Jan. 23, 1986, now abandoned.

This invention relates in general to an automotive crankshaft vibration damper, and more particularly to the construction of a bifilar pendulum type damper.

Bifilar pendulum dampers are well known for suppressing engine vibrations by tuning the pendulum mass to a natural frequency that equals the crankshaft excitation frequency. For example, U.S. Pat. No. 3,932,060, Vincent, U.S. Pat. No. 2,184,734, Chilton, U.S. Pat. No. 2,306,959, Knibbe, U.S. Pat. No. 3,540,809, Paul et al, U.S. Pat. No. 2,272,189, Depew, U.S. Pat. No. 2,535,958, Sarazin, U.S. Pat. No. 4,218,187, Madden, and British No. 401,962, Salomon, all show the use of bifilar pendulum dampers to balance or cancel out undesirable order vibrations of an engine. In these cases, the crankshaft is connected to the pendulum mass by rollers that in different ones of the references move in circular, cycloidal, elliptical or epicycloidal paths in an attempt to maintain a constant tuning or tautochronic action to the pendulum so that all of the engine vibrations of one or more orders are exactly balanced.

U.S. Ser. No. 783,386, filed Oct. 3, 1985, and U.S. Ser. No. 826,511, filed Feb. 5, 1986, now abandoned, both show and describe bifilar pendulum dampers that are designed to prevent mechanical damage to the system by preventing swing amplitudes of the pendulum masses beyond their mechanical limits or capacity. The pendulum masses at low amplitude swing angles almost completely cancel engine vibrations by tracking of the rollers along a path which generates approximately tautochronic motion of the pendulums. At higher or greater amplitudes, means are provided to automatically detune the pendulums; i.e., they progressively become less and less tuned to the excitation frequency of the crankshaft. This results in a progressive decrease in the response of the pendulum to the vibrational impulses, which limits the swing amplitude at higher torsional vibration excitation levels to maintain the pendulum mass within its swing angle capacity.

The invention to be described herein relates more closely to a bifilar pendulum damper of the type disclosed in U.S. Ser. No. 783,386 and U.S. Ser. No. 826,511, and is less complex in structure than the conventional bifilar pendulum dampers indicated in the patented prior art above. More specifically, it relates to one that has a reduced noise level in operation.

In a conventional crankshaft pendulum assembly, the pendulums generally are located either on the crankshaft itself, as shown, for example, in FIG. 30.17 (continued) on page 661 of *Practical Solutions of Torsional Vibration Problems* by W. Ker Wilson, Volume Four-Devices for Controlling Vibrations, Third Edition. This, however, requires precision machining at somewhat awkward locations on the crankshaft. Alternatively, the pendulums may be located on a bolt-on type carrier; however, in this case, they can be installed only to the ends of the crankshaft, as shown, for example, in FIGS. 29.17 and 30.19 of Wilson, referred to above.

In the assembly of this invention, the carrier is mounted to the crankshaft onto a turned diameter with flats to prevent rotation of the carrier relative to the crankshaft. A clamp, similar to a main bearing cap, retains the assembly to place. This allows installation of pendulums at each cheek along the length of the crankshaft without any of the precision machining done to the crankshaft itself.

In the conventional pendulum assembly, when the pendulums are straddle mounted to the carrier by a yoke type connection, the hardened steel pendulum rollers are loaded in one direction near their ends and in the opposite direction at the middle. This subjects the rollers to high contact stresses, bending and shear stress. Also, to control the contact stress between the roller and crankshaft web, the crankshaft web that is received in the yoke of the pendulum has to be as thick as one half the roller length, which is much thicker than required to support its tensile load. This means that the crankshaft web occupies space which could otherwise be used to increase pendulum mass and thus, pendulum effectiveness.

In the assembly of this invention, the width of the rollers is essentially the same as the width of the pendulums and carrier so that the rollers will be loaded along their full length by both the pendulum and carrier. This eliminates the bending and shear loading and reduces the contact stresses. Also, the pendulums occupy essentially the entire thickness of the assembly.

In the conventional pendulum assembly, at the end of its swing, the pendulum usually is stopped by metal to metal contact. This would not likely occur during normal engine operation, but can cause considerable noise during engine start-up and shut-down when the crankshaft is rotated at a low speed. The centrifugal force acting on the pendulum then can be overcome by gravity. This causes alternate operation of the pendulum to first fall inwardly toward and against the crankshaft, then outwardly to be caught by the rollers. In addition to the noise caused by falling inwardly against the crankshaft, there is noise caused by the impact against the rollers.

In the carrier assembly of this invention, a stop pin is mounted to the cover plate of the carrier close to a cam surface formed on the radially inner portion of the pendulum. During normal pendulum operation, there will be a small radial clearance between the pin and the pendulum throughout the pendulum's swing. However, during low speed operation, when gravity pulls the pendulum inwardly against centrifugal force, the cam comes in contact with the pin and forces the pendulum to follow a path very close to the one it follows in normal operation. This keeps the pendulum and rollers in proper position so that when the pendulum again is thrown outwardly, there is only a very small clearance from pendulum to rollers to carrier, and the impact and noise on next contact with the carrier, therefore, is minimal.

It is a primary object of the invention, therefore, to provide a bifilar pendulum damper that is simple in construction and assembly, provides ease of attachment to the engine crankshaft, eliminates shear and bending loads on the rollers, and has means to control the pendulum motion at low speeds to reduce noise.

Another object of the invention is to provide a bifilar pendulum damper of the type described with means to adjust the center of gravity of the pendulums to permit changing the tuning of the pendulum.

Other objects, features and advantages of the invention will become more apparent upon reference to the succeeding, detailed description thereof, and to the drawings illustrating the preferred embodiment thereof; wherein.

The bifilar pendulum damper known in the prior art previously referred to is provided with circular rollers that operate in circular or other shaped holes in both the crankshaft and pendulum masses. This results in a swing amplitude or angle of oscillation of the pendulum mass that increases progressively in proportion to increases in the excitation forces or vibrations. It also results in a progressive detuning of the pendulum mass as the oscillation angle increases, as pointed out in FIGS. 6 and 7 of Madden referred to above.

Figure 1:
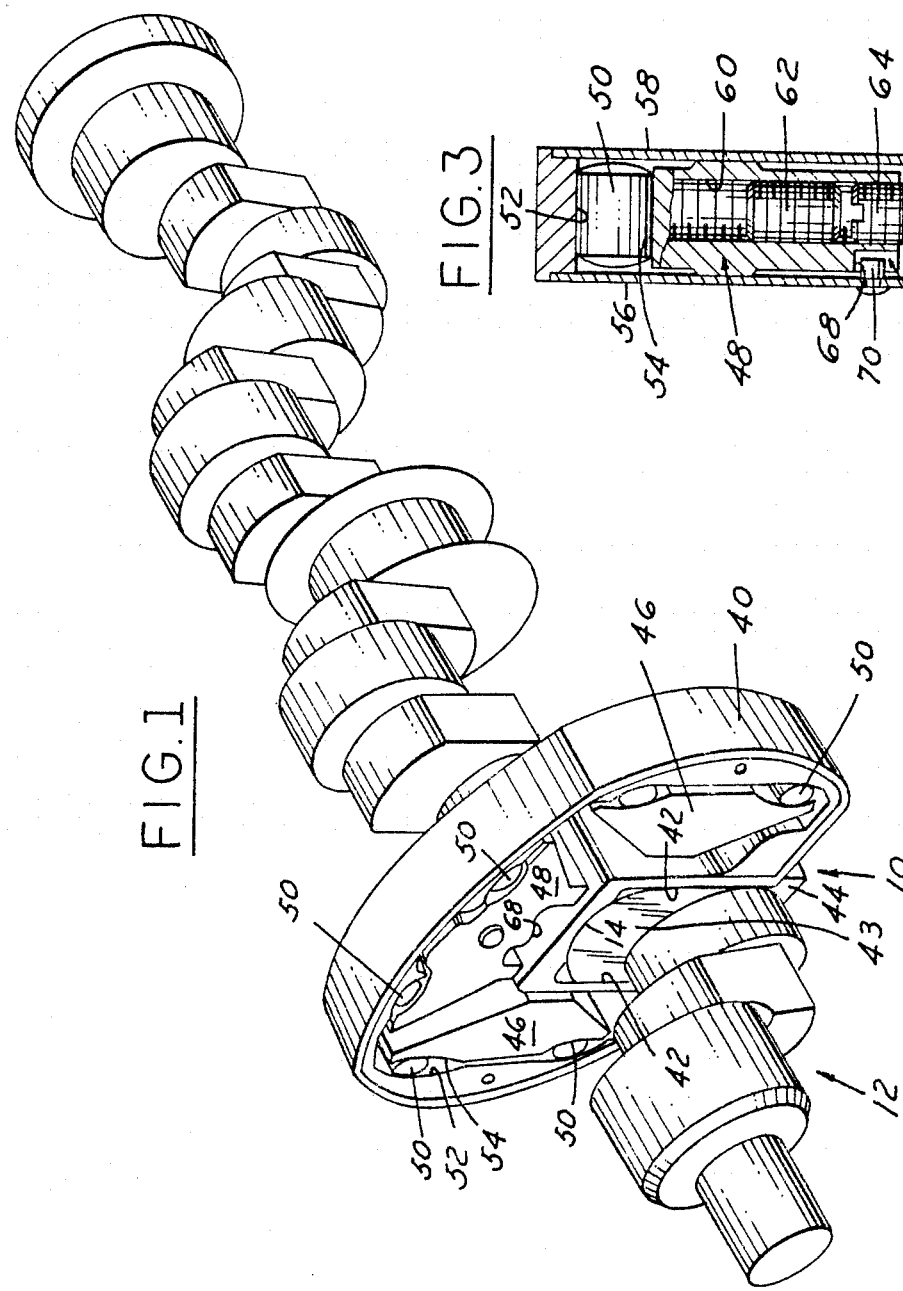
FIG. 1 is a perspective view of a bifilar pendulum damper constructed according to the invention assembled to an engine crankshaft.
Figure 2:
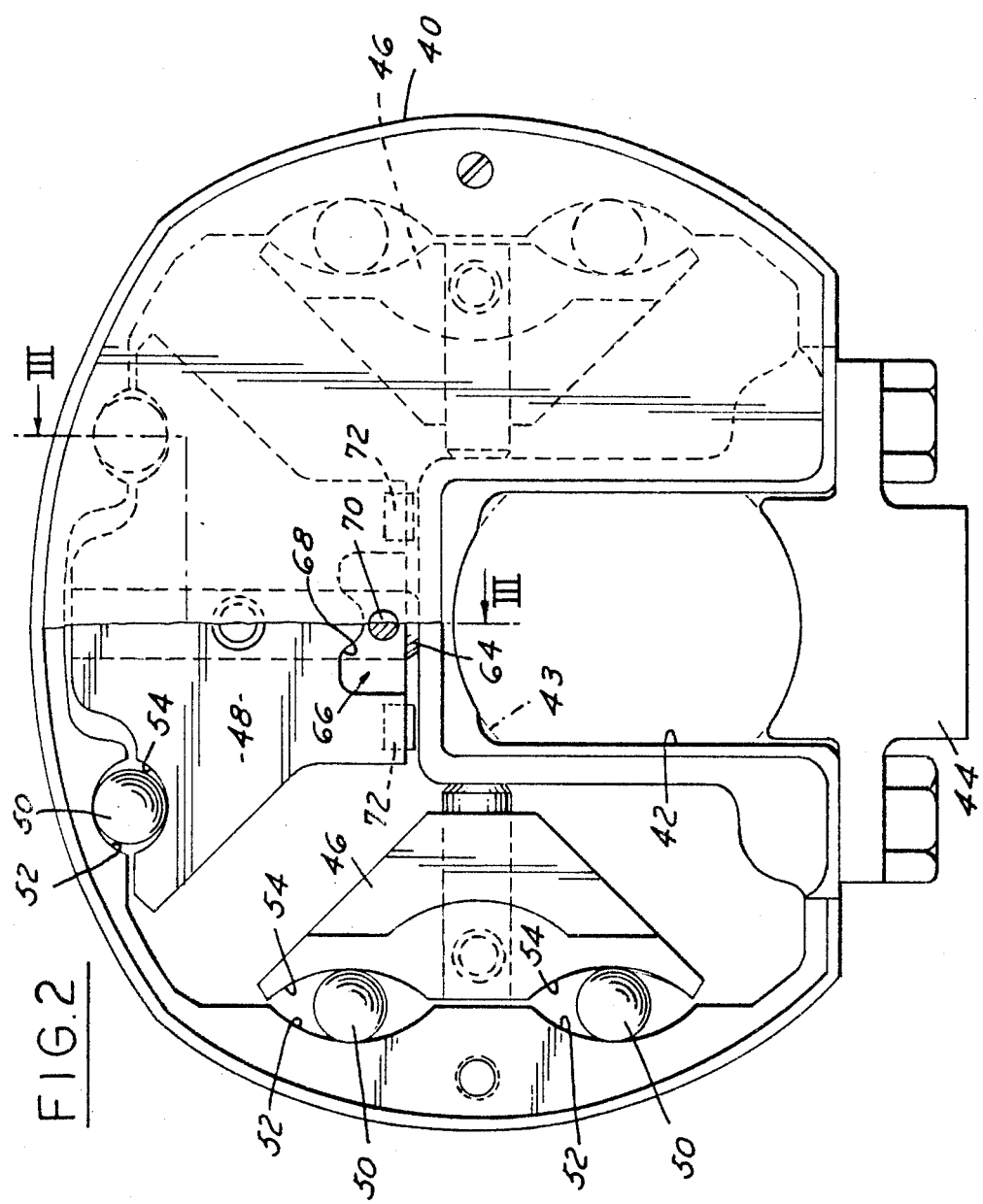
FIG. 2 is an enlarged end elevational view of the bifilar pendulum damper shown in FIG. 1, with the carrier end cover plate removed for clarity.

FIG. 1 is a perspective view of one bifilar pendulum damper assembly 10 fastened to an automotive engine crankshaft 12 on a cheek 14 of the connecting rod pin. It will be clear that as many as eight such assemblies could be assembled to the crankshaft of an inline four cylinder engine, for example, as desired. FIG. 2 illustrates more clearly the construction of the one assembly. 40 is a one-piece, U-shaped pendulum carrier member having an opening 42 adapted to straddle a cheek 14 (FIG. 1) of the engine crankshaft 12. This cheek portion of the crankshaft is provided with an arcuate flat 43 that is nested within the opening of the carrier that is held to the shaft by a clamp 44 screwed to the carrier.

The carrier assembly shown in this particular case is designed to balance second order translational vibrations of the engine by the use of two first and one third order bifilar pendulums 46 and 48, respectively, tuned to be responsive to vibrations of those orders. The carrier and pendulums are interconnected radially by pairs of rollers 50 movable on mating curved tracks 52, 54. The tracks are arcuate portions of overlapping holes constructed as described previously. That is, the hole contour starts out essentially as a circular path with constant radius for the first ±15° or so of swing amplitude of the roller; the hole contour or track of the roller thereafter having a progressively decreasing radius of curvature as the swing amplitude increases beyond 15° swing angle, to progressively detune the pendulums to respond less and less to the excitation frequency of the crankshaft and carrier 40, in the manner previously described.

Figure 3:
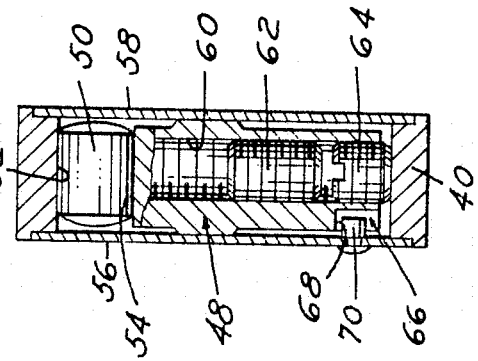
FIG. 3 is a cross-sectional view taken on a plane indicated by and viewed in the direction of the arrows III—III of FIG. 2.

As seen in FIGS. 2 and 3, each pendulum 46, 48 is floatingly mounted in the cavity of the carrier between the crankshaft mount portion 42 on the one hand and the carrier shaped roller tracks 52 on the other hand, with the rollers 50 inbetween. The rollers and pendulums are confined laterally by a pair of front and back cover plates 56 and 58, the front plate 56 having been removed in FIGS. 1 and 2 for clarity.

Referring specifically to pendulum 48 as an example, and bearing in mind that other order pendulums could be constructed in a similar manner, FIG. 3 shows pendulum 48 as having a central threaded bore 60 for varying the tuning of the pendulum as well as its inner swinging movement. More particularly, a weight adjustment screw 62 is threadedly mounted in bore 60 and can be moved vertically to shift the location of the center of gravity of the pendulum to change its natural frequency or tuning. This is helpful if it is desired to retune the various pendulums for test as well as other purposes, for example. Also shown is an adjustable bumper screw 64 that limits the innermost movement of the pendulum.

Referring to both FIGS. 2 and 3, the inner surface of the pendulum is provided with an axially and radially extending recess 66 that has a shaped curve 68 that serves as a cam surface. The cam surface cooperates with a stop pin 70 fixed to the carrier front cover plate 56. The shape of the cam surface is such that when the pendulum swings arcuately outwardly under centrifugal force during normal engine speed operation, there will be a small radial clearance at all times between the pin and cam surface; i.e., the pin in effect follows the normal track or path of the pendulum with only a small clearance between. Then during low speed operation, when gravity overcomes the centrifugal force acting on the pendulum, the inward movement of the pendulum will engage the cam surface with pin 70 and force the pendulum to follow a path essentially the same as that during the normal motion at higher speeds.

As stated previously, the cam tracking motion maintains the pendulum and rollers 50 in proper position to reduce the impact on the rollers and the noise when the pendulum again is thrown outwardly, and, conversely, minimize the impact and noise of the bumper 64 on the carrier. Elastomeric bumpers 72 also can be provided in the base or inner surface of each pendulum to further reduce the impact of metal to metal banging contact between the carrier and pendulum at both ends of the swing of the pendulums, and consequently the noise level.

While the invention has been shown and described in its preferred embodiment, it will be clear to those skilled in the arts to which it pertains that many changes and modifications may be made thereto without departing from the scope of the invention.

What is claimed is:

1. A bifilar pendulum type vibration absorber for an automotive type internal combustion engine comprising a hollow pendulum carrier secured to an engine crankshaft for rotation therewith, a pendulum mass floatingly contained in the carrier between a pair of laterally spaced rollers at its outer radius and the carrier at its inner periphery for a swingable oscillatory arcuate movement in opposite lateral directions from a central rest position in response to centrifugal and gravitational forces acting on the mass during engine crankshaft vibrational impulses, the rollers being movably contained between non-circular curved tracks formed by the walls of non-circular overlapping holes in the carrier and pendulum mass, the mass being movable arcuately outwardly by the effects of centrifugal force acting thereon to effect positive engagement of the rollers with both the inner and outer tracks for a guiding rolling movement of the rollers on the tracks upon translatory movement of the pendulum mass, the pendulum mass having an axially and radially extending recess at its inner periphery defining a cam follower surface, the surface being defined by a free formed shaped curve symmetrically formed on opposite sides of an extension of the centerline of the mass in the rest position of the mass, the surface during low rotational crankshaft speeds engaging a pin type cam nonmovably secured to the carrier on the extension of the centerline, the mass moving out of contact with the pin above predetermined rotational speeds, the cam follower surface being defined by a curve duplicating the path of the mass during movement of the mass laterally in response to centrifugal and gravitational forces acting on the mass in response to engine crankshaft speed changes, the outward movement of the mass establishing a small clearance space between the pin and cam follower surface that is maintained constant in distance between the pin and surface by the shape of the curve regardless of the lateral position of the mass so long as the centrifugal forces are above a predetermined level, engine speed decreases establishing gravitational forces on the mass urging the mass inwardly against the pin eliminating the clearance space between the mass and pin and forcing the mass as it moves laterally to follow the curve of the cam follower surface, the small clearance spaced reducing the impact between the mass and pin upon inward movement of the mass and between the mass and rollers upon outward movement of the mass, the curve of the surface when engaged with the pin at the lower rotational speeds maintaining the mass on a path paralleling the path of the mass at higher rotational speeds and separated from the latter path only by the amount of the clearance space whereby the mass when at rest or at the lower speeds is in a position to regain its higher speed path quickly by moving only through the distance of the clearance space.

* * * * *